2 Sheets—Sheet 1.
J. B. WHEELER.
Grain Drier.
No. 38,191. Patented April 14, 1863.
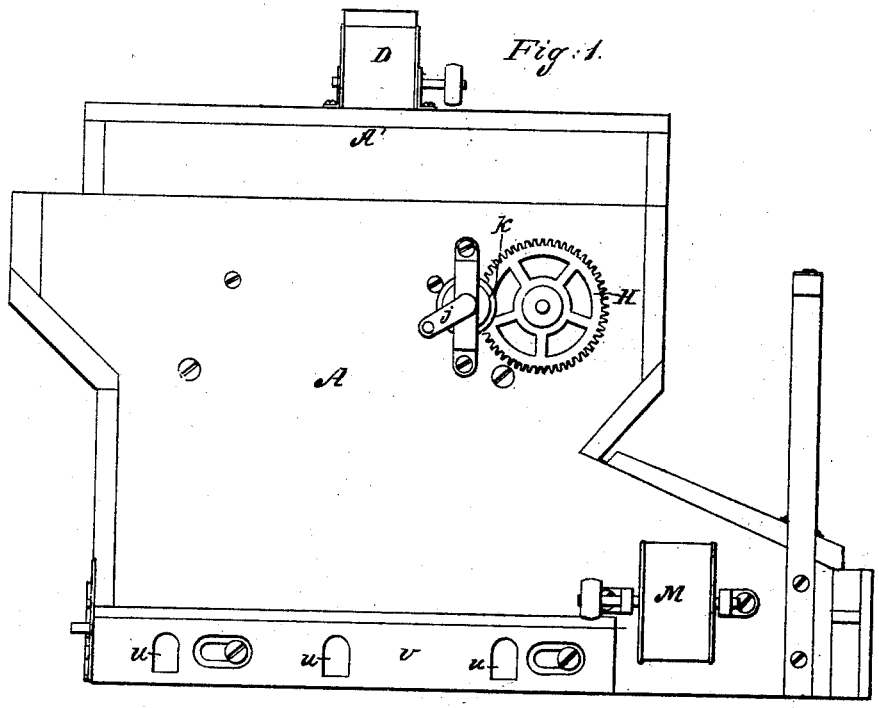
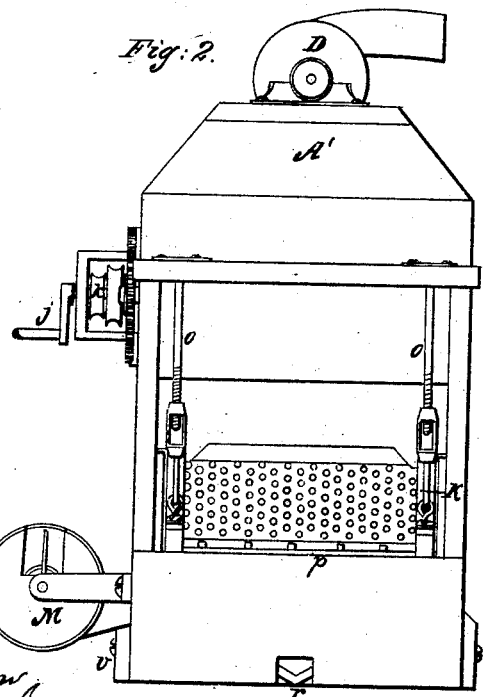

J. B. WHEELER.
Grain Drier.

No. 38,191. Patented April 14, 1863.

Witnesses:
P. E. Wilson
Edwin Evans Jr.

Inventor:
Jesse B. Wheeler
By atty A. B. Stoughton.

UNITED STATES PATENT OFFICE.

JESSE B. WHEELER, OF BOLTON, MASSACHUSETTS.

IMPROVEMENT IN GRAIN-DRIERS.

Specification forming part of Letters Patent No. 38,191, dated April 14, 1863.

*To all whom it may concern:*

Be it known that I, JESSE B. WHEELER, of Bolton, in the county of Worcester and State of Massachusetts, have invented a new and useful Improvement in Machines for Drying and Cooling Grain, Flour, Meal, and other Similar Articles; and I do hereby declare the following to be a full, clear, and exact description of the same, reference being had to the accompanying drawings, making a part of this specification, in which—

Figure 3:
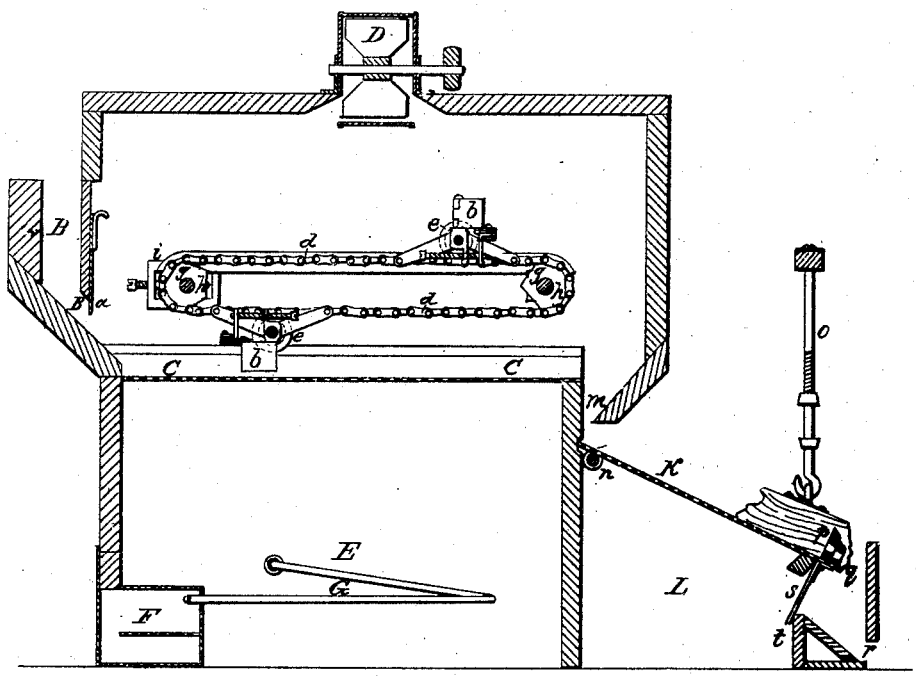
Figure 4:
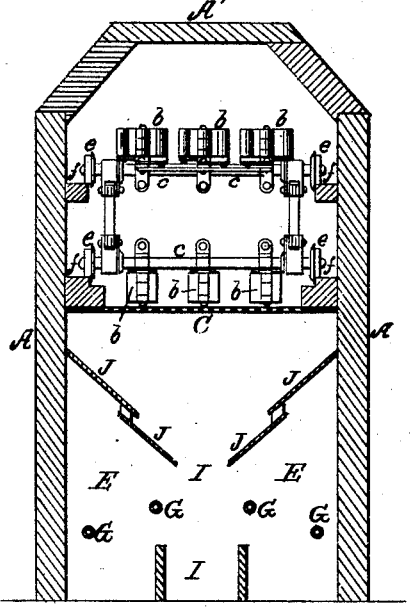
Figure 5:
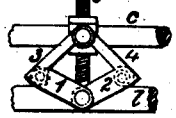

Figure 1 represents a side elevation of the machine. Fig. 2 represents an end view thereof. Fig. 3 represents a vertical, longitudinal, and central section through the machine. Fig. 4 represents a vertical transverse section; and Fig. 5 represents, on an enlarged scale, one of the stirrers, and its connections and mode of adjustment.

Similar letters of reference, where they occur in the several figures, denote like parts of the apparatus in all the drawings.

To enable others skilled in the art to make and use this invention, I will proceed to describe the same with reference to the drawings.

A represents a case which is furnished with suitable inlet and exit passages, commanded by valves or registers, as will be hereinafter explained, but otherwise comparatively tight. At one end of this case there is a hopper or feeding-passage, B, commanded by a slide, *a*, by which said passage may be enlarged or diminished, as it may be desirable to feed in the grain or other material to be dried and cooled, in greater or less quantities. The material, having passed through the feed-passage B, drops upon one end of a perforated bottom, C, through the perforations of which heated or dried air is drawn by an exhaust-fan, D, arranged on top of the cover A' of the case. The air thus drawn through the perforated bottom and through the grain or other material passed along over it, is heated in a chamber, E, in the lower part of the case by the heaters F and the flue-pipes G, extending therefrom through the said chamber E, the exhaust-fan creating the draft by which it circulates through the grain, &c. This heated air becomes charged with the moisture that it takes up from the grain, and when expelled by the fan, other heated air takes its place and becomes surcharged with moisture, and so on. The grain is stirred and advanced over the perforated bottoms C by means of adjustable arms or stirrers *b*, arranged on cross-shafts *c*, that are united at their ends to endless traveling chains or belts *d* at the sides of the case, these chains having guide-wheels *e e*, that run on ways *f*, connected to the sides of the case, and also sprocket-wheels *g*, around which they move, the sprocket-wheels being on shafts *h*, whose bearings run in adjustable boxes *i*, so as to keep the chains properly strained up. On the outside of the case there may be a crank, *j*, or a pulley, *k*, through or by means of which and of a pinion on their shaft motion is communicated to the cog-wheel H on one of the shafts *h*, and through this shaft to the endless chains and stirrers and movers thereon, for advancing and stirring the grain, &c.

The stirrers, as more distinctly seen in Fig. 5, are composed of four arms, 1 2 3 4, hinged to each other and connected to the shaft *c*, and to a bar, *l*, so that by means of a set-screw, 5, the arms 3 4 may be moved apart or drawn toward each other to present more or less moving surface to the grain or other material being dried, and these stirrers or movers may be run at a greater or less velocity for a similar purpose—viz., of advancing more or less rapidly the grain or other material over the perforated bottom and through the air-heated chamber. Any dirt, dust, or impure matter that passes through the perforated bottom drops or is conducted through the open space I by the deflecting boards or plates J, whence it can be removed through a door at the end of the case. The dust or impurities that rise above the perforated bottom are drawn out by the exhaust-fan D, so that it is also a cleansing as well as a drying and cooling process. The grain, having been dried and passed over the bottom C by means of the stirrers and movers *b*, drops through the passage *m* onto a perforated apron, K, which is hinged at its upper end, as at *n*, and can be raised or lowered at its lower end by the swivel-rods *o o*. The object in raising and lowering this apron K is to give the apron such an inclination only as will allow the grain or other material to slide or move over it by its own gravity, and to hasten or retard it as the case may be. At the lower end of the apron K there are boards *p q*, furnished with openings. One of these boards, *q*, being so arranged by slots and set-screws as that it may be moved register-fashion upon the other, $p$, to open or close the passages through them, and thus limit the passage of the grain or other material through them. When the passages are closed, then the grain must pass over the top of the board $p$, and thence through the exit-passage $r$ out of the machine.

Underneath the apron K there is a cold-air chamber, L, into which the cool air is blown by a fan-blower, M, and thence this air rises up through the perforated bottom and through the material, passing over it, which cools it. At the lower end and under side of the apron K there is a hinged valve, $s$, which rests against the part $t$ of the frame. This valve, as the apron is raised or lowered, keeps the space under the apron closed, so that the only escape for the cool air out of the chamber L is through the perforations in the apron K. The main chamber E is furnished with air through the openings $u$, Fig. 1, which are commanded by a register, $v$, to regulate the quantity introduced. All the inlet and exit openings or passages are controllable by slides, valves, or registers, except that $m$, which is not so material, but even this may be commanded, if necessary, by a slide or valve.

Having thus fully described my invention, what I claim therein as new, and desire to secure by Letters Patent, is—

1. In arranging the walls for forming the dust-space I, as above described, in combination with the guiding-plates J, substantially as herein described, and for the purpose set forth.

2. In combination with the hot-air chamber E, perforated bottom C, and the stirring and moving arms traversing over it, the exhaust-fan D, for drawing the heated air up through the grain and through the machine, substantially as described.

3. In combination with the hinged apron K, overlying the cool-air chamber L, the raising and lowering rods $o$ $o$, and hinged valve $s$, so that said apron may be raised or adjusted without opening the chamber L, substantially as described.

4. As a stirring and moving mechanism or device, the arms $b$ $b$, hinged, made adjustable, and moved by endless chains, substantially as herein described and represented.

JESSE B. WHEELER.

Witnesses:
STEPHEN A. RANDALL,
WALDO E. KIMMENS.